(12) United States Patent
Murakami (10) Patent No.: US 8,720,280 B2
(45) Date of Patent: May 13, 2014

(54) ULTRASONIC FLOWMETER APPARATUS

(71) Applicant: Atsuden Co., Ltd., Tokyo (JP)

(72) Inventor: Eiichi Murakami, Tokyo (JP)

(73) Assignee: Atsuden Co., Ltd., Tokyo (JP)

( * ) Notice: Subject to any disclaimer, the term of this patent is extended or adjusted under 35 U.S.C. 154(b) by 0 days.

(21) Appl. No.: 13/737,162

(22) Filed: Jan. 9, 2013

(65) Prior Publication Data

US 2013/0180341 A1   Jul. 18, 2013

(30) Foreign Application Priority Data

Jan. 13, 2012 (JP) ................................ 2012-005307
Mar. 9, 2012 (JP) ................................ 2012-053436

(51) Int. Cl.
*G01F 1/20* (2006.01)

(52) U.S. Cl.
USPC ....................................................... 73/861.18

(58) Field of Classification Search
USPC ................ 73/861.18, 861.28, 861.27, 861.26
See application file for complete search history.

(56) References Cited

U.S. PATENT DOCUMENTS 3,987,674 A * 10/1976 Baumoel ..................... 73/861.28
5,463,906 A * 11/1995 Spani et al. ................. 73/861.27

FOREIGN PATENT DOCUMENTS

| JP | 2002-365106 A | 12/2002 |
| JP | 2003-75219 A | 3/2003 |
| JP | 2003-262545 A | 9/2003 |

* cited by examiner

*Primary Examiner* — Jewel V Thompson (74) *Attorney, Agent, or Firm* — Holtz, Holtz, Goodman & Chick, PC (57) ABSTRACT

A conduit P is clamped within a clamping hole 16 formed by min body 1, left and right side plates 2, 4 and top plate 3. The clamping hole is maintained by a locking mechanism 5, 5a and 11, and the conduit is deformed to have a substantially square cross section. Ultrasonic signal transmission and reception elements 13a and 13b are arranged in the main body such that an ultrasonic beam emitted from one of the elements is received by the other element after the beam is reflected by the top plate.

20 Claims, 10 Drawing Sheets

Prior art

ULTRASONIC FLOWMETER APPARATUS

BACKGROUND OF THE INVENTION

1. Field of the Invention

The present invention relates to a clamp-on type ultrasonic flowmeter apparatus for measuring a flow rate of a fluid flowing through a conduit by transmitting ultrasonic wave beams through the fluid.

2. Related Art Statements

Figure 22:
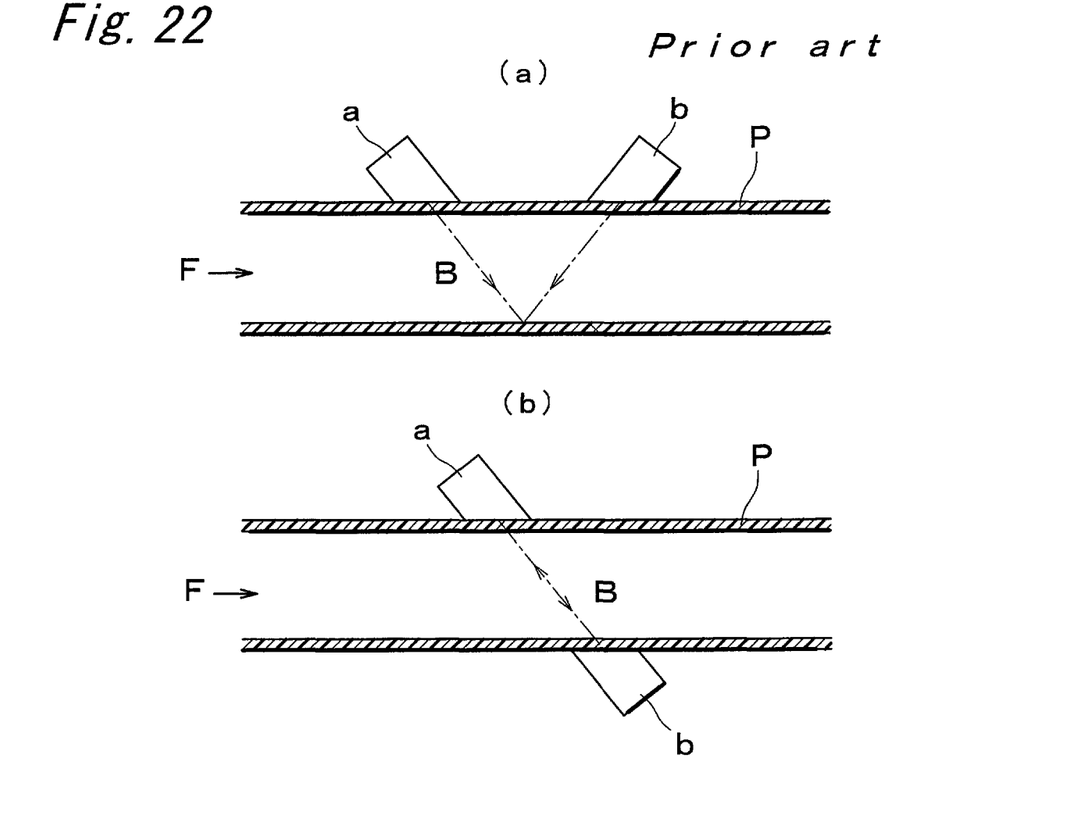
FIGS. 22(a) and 22(b) are schematic views showing the two types of the ultrasonic flowmeter apparatus.

The ultrasonic flowmeter apparatus may be roughly classified into a V-system shown in FIG. 22(a) and a Z-system illustrated in FIG. 22(b). In the V-system, a pair of ultrasonic signal transmission and reception elements a and b are arranged on the same side of a conduit P and an ultrasonic beam B emitted from one of the elements a or b is reflected within the conduit and is received by the other element b or a. In the Z-system, the ultrasonic signal transmission and reception elements are arranged on mutually opposing sides of the conduit 2, and an ultrasonic beam B emitted from one of the elements a or b and propagating across the conduit P is received by the other elements b or a. In both systems, the ultrasonic signal transmission and reception elements a and b are arranged at an upstream position and a downstream position, respectively viewed in a flow of a fluid F flowing through the conduit P. Therefore, there is a difference between a propagating time of the ultrasonic beam B emitted from the upstream element a and received by the downstream element b and a propagating time of the ultrasonic beam B emitted from the downstream element b and received by the upstream element a. A flow speed of the fluid F passing through the conduit P can be calculated from the above mentioned difference in the propagating time, and a flow rate of the fluid F can be obtained by a product of the flow speed and a cross sectional area of the conduit P.

In the following Japanese Patent Publications 1~3, there are disclosed known clamp-on type ultrasonic flowmeter apparatuses for measuring a flow rate of a fluid flowing through an existing conduit by fitting the apparatus to the conduit from external.

PRIOR ART DOCUMENTS

Japanese Patent Documents

Patent Document 1: Japanese Patent Publication Kokai No. 2002-365106
Patent Document 2: Japanese Patent Publication Kokai No, 2003-75219
Patent Document 3: Japanese Patent Publication Kokai No. 2003-262545

SUMMARY OF THE INVENTION

Problems to be Solved by the Invention

In the known clamp-on type ultrasonic flowmeter apparatuses, a pair of ultrasonic signal transmission and reception elements having a configuration matched with an outer configuration of a conduit must be intimately fixed to the conduit with the aid of a complicated mechanism. Therefore, upon measuring the flow rate, it is rather difficult to fix the ultrasonic flowmeter apparatus in an easy manner.

Moreover, each of the known ultrasonic flowmeter apparatuses is made of a plurality of metal blocks, and therefore when a diameter of the conduit is large, a weight of the apparatus becomes heavy and it is cumbersome to handle the heavy apparatus.

In order to remove the above mentioned drawbacks, the present invention has for its object to provide ultrasonic flowmeter apparatus which can be easily fixed to a conduit by means of a simple clamp mechanism and is light in weight.

Means for Solving the Problems

According to one aspect of the invention, in order to achieve the above object, an ultrasonic flowmeter apparatus detachably secured to a conduit made of a resilient and soft material for measuring a flow rate of a fluid flowing through said conduit comprises four plate-like members each having a flat inner surface;

a hinge mechanism for coupling said plate-like members to be folded freely to constitute a clamping hole by said inner surfaces, said clamping hole having a rectangular cross sectional configuration;

a clamping mechanism for maintaining the clamping hole to have the rectangular cross sectional configuration; and a pair of ultrasonic signal transmission and reception elements arranged in an inner surface of one of said four plate-like members such that these ultrasonic signal transmission and reception elements is separated in a longitudinal direction of the conduit;

wherein said clamping hole is formed to have such a size that when the conduit is clamped within the clamping hole, the conduit is resiliently deformed to have a substantially rectangular cross sectional configuration and is brought into intimate contact with the inner surfaces of the plate-like members, and said ultrasonic signal transmission and reception elements are arranged at such positions that an ultrasonic beam emitted from one of the ultrasonic signal transmission and reception elements is received by the other ultrasonic signal transmission and reception element after the ultrasonic beam is reflected at a portion of an inner surface of a plate-like member which is opposed to the plate-like member in which the ultrasonic signal transmission and reception elements are arranged.

According to a second aspect of the invention, an ultrasonic flowmeter apparatus detachably secured to a conduit made of a resilient and soft material for measuring a flow rate of a fluid flowing through the conduit comprises four plate-like members each having a flat inner surface;

a hinge mechanism for coupling said plate-like members to be folded freely to constitute a clamping hole by said inner surfaces, said clamping hole having a rectangular cross sectional configuration;

a clamping mechanism for maintaining the clamping hole to have the rectangular cross sectional configuration; and a pair of ultrasonic signal transmission and reception elements arranged in inner surfaces of two plate-like members diagonally opposed to each other, said ultrasonic signal transmission and reception elements being separated in a longitudinal direction of the conduit;

wherein said clamping hole is formed to have such a size that when the conduit is clamped within the clamping hole, the conduit is resiliently deformed to have a substantially rectangular cross sectional configuration and is brought into intimate contact with the inner surfaces of the plate-like members, and said ultrasonic signal transmission and reception elements are arranged at such positions that an ultrasonic beam emitted from one of the ultrasonic signal transmission and reception elements is received by the other ultrasonic signal transmission and reception element.

Merits of the Invention

In the ultrasonic flowmeter apparatus according to the invention, the apparatus can be easily fitted on a conduit and a flow rate of a fluid flowing through the existing conduit can be measured easily.

In the drawings, a reference numeral 1 denotes a main body, 2, 22 left side plate, 3, 34 top plate, 4, 24 right side plate, 5 locking plate, 6 fixing plate, 7-12 shaft, 13a, 13b ultrasonic signal transmission and reception element, 14a, 14b lead wire, 15a, 15b ultrasonic beam propagating member, 16 clamping hole, 17 calculation and control unit, 18 display unit, 21, 31 first main body, 23, 32 second main body, 33 bottom plate, 35, 36 supporting member, B ultrasonic beam, P conduit, and F represents a liquid,

DESCRIPTION OF THE PREFERRED EMBODIMENTS

Now the present invention will be explained in detail with reference to embodiments shown in the drawings.

Embodiment 1

Figure 1:
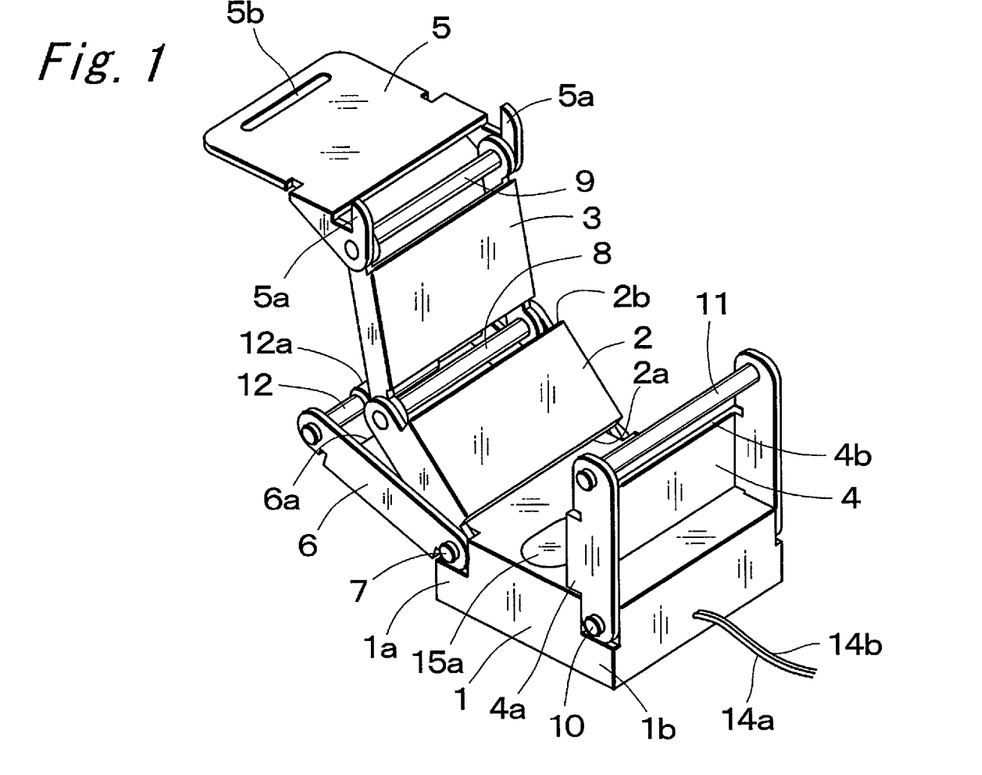
FIG. 1 is a perspective view showing a first embodiment 1 of the ultrasonic flowmeter apparatus according to the invention prior to fixing the apparatus to a conduit.

FIG. 1 is a perspective view showing a first embodiment of the clamp-on type ultrasonic flowmeter apparatus according to the invention. The ultrasonic flowmeter apparatus belongs to the V-system and is detachably fixed to an existing conduit made of a soft and resilient material. The ultrasonic flowmeter apparatus comprises a main body 1, a left side plate 2, a top plate 3, a right side plate 4, a locking plate 5 and a fixing plate 6. These plate-like members are coupled with each other by means of suitable hinges such that the plates can be folded into a desired configuration. That is to say, one ends of the left side plate 2 and fixing plate 6 are coupled to one side 1a of the main body 1 by means of a coupling shaft 7 such that the left side plate 2 situates at an inner position than the fixing plate 6. The other end of the left side plate 2 is connected to one end of the top plate 3 by means of a coupling shaft 8, and the other end of the top plate 3 is connected to one end of the locking plate 5 by means of a coupling shaft 9. Furthermore, the other end 1b of the main body 1 is connected to one end of the right side plate 4 by means of a coupling shaft 10.

The main body 1 constituting a base plate may be formed by an injection mold of synthetic material. The left side plate 2, top plate 3, right side plate 4, locking plate 5 and fixing plate 6 may be formed by punching a metal sheet with a press such that each of these plates includes a flat portion and both side portions extending perpendicularly to the flat portion. The ends of the coupling shafts 7, 8, 9 and 10 are inserted into holes formed in the side portions of the plates. Each of the main body 1, left side plate 2, top plate 3 and right side plate 4 has a flat inner surface on which a Teflon (registered trade mark) resin coating layer or a suitable metal plating layer may be applied in order that the conduit can easily slide along the flat surface.

The locking plate 5 has claw portions 5a at outer sides of both ends of the coupling shaft 9, and a locking shaft 11 is provided to the right side plate 4 at a free end thereof such that the claw portions 5a are engaged with the locking shaft 11 upon assembling. The locking plate 5 has formed therein an elongated slit 5b extending along a free end hereof. A rotating shaft 12 is journalled to the side portions of the fixing plate 6 such that the rotating shaft 12 extends in parallel with a free edge 6a of a flat portion of the fixing plate 6. The rotating shaft 12 has a central engaging portion 12a whose diameter is slightly larger than that of the remaining portions of the rotating shaft 12. As will be explained later, in the locked condition, a part of the central engaging portion 12a of the rotating shaft 12 is engaged into the slit 5b formed in the locking plate 5.

Figure 2:
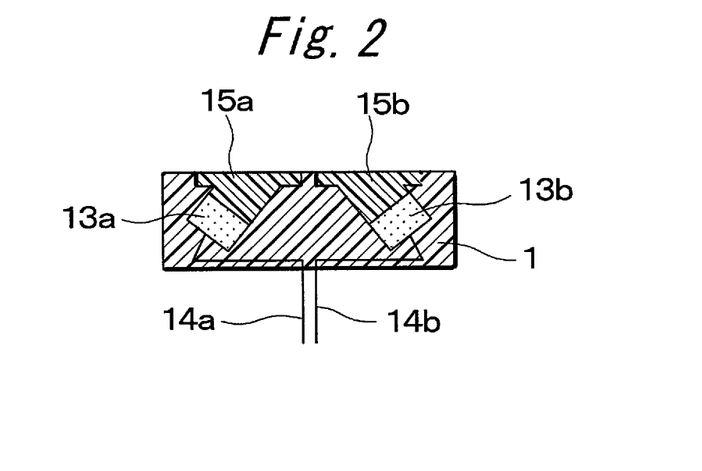
FIG. 2 is a cross sectional view illustrating a main body.

As shown in FIG. 2, a pair of ultrasonic signal transmission and reception elements 13a and 13b is provided within the main body 1 such that these elements 13a and 13b are separated from each other in a direction parallel with the coupling shafts 7-10, i.e. in a longitudinal direction of the conduit. The ultrasonic signal transmission and reception elements 13a and 13b are electrically connected to a measuring circuit by means of lead wires 14a and 14b. Furthermore, ultrasonic beam propagating members 15a and 15b are provided between the ultrasonic signal transmission and reception elements 13a and 13b and the inner surface of the main body 1.

Figure 3:
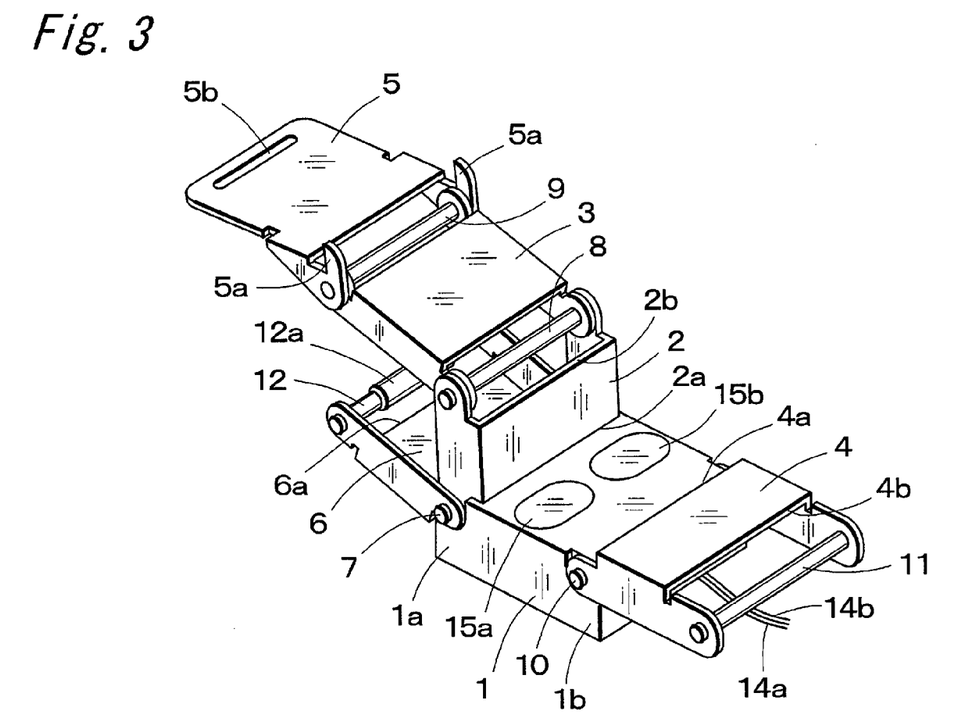
FIG. 3 is a perspective view depicting a condition in which a right side face plate and a left side face plate are opened.

FIG. 3 is a perspective view showing a condition in which the left side plate 2 is folded on the main body 1. The left side plate 2 and fixing plate 6 are journalled to the one side 1a of the main body 1 by means of the coupling shaft 7, and the rotation of the left side plate 2 is limited by the engagement of a side 2a of the flat surface of the left side plate with inner surface of the main body 1 such that the left side plate 2 extends substantially perpendicularly to the inner surface of the main body 1. The right side plate 4 having a longer length than the left side plate 2 is also journalled to the end 1b of the main body 1, and the rotation of the right side plate 4 is limited by the engagement of the side 4a of the right side plate 4 with the inner surface of the main body 1 such that the right side plate 4 stands on the main body 1 substantially perpendicularly to the inner surface of the main body 1. The top plate 3 is journalled to the left side plate 2 by means of the coupling shaft 8 and the rotation of the top plate 3 is limited by the engagement of the inner surface of the top plate 3 with the side 2b of the left side plate 2 such that the top plate 3 extends substantially perpendicularly to the inner surface of the left side plate 2

Figure 4:
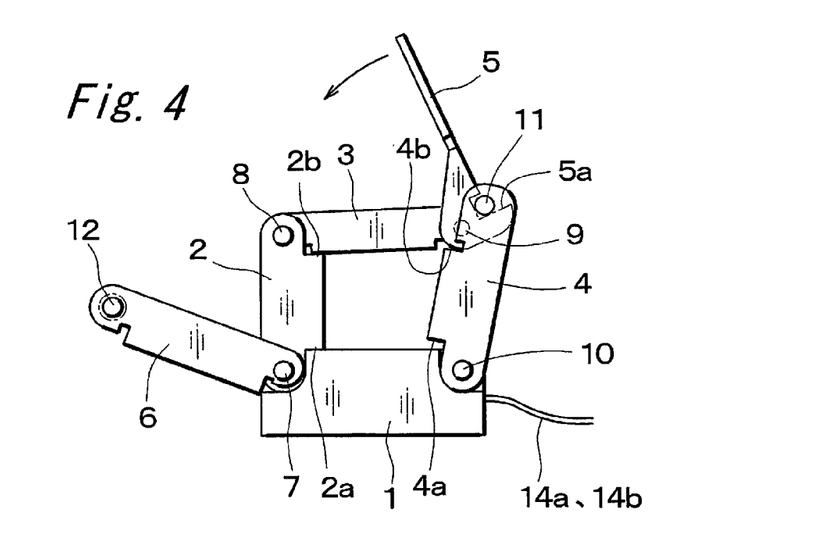
FIG. 4 is a side view representing a process for forming a clamping opening.

As illustrated in FIG. 4, after the left side plate 2 and right side plate 4 have been rotated to extend substantially perpendicularly to the inner surface of the main body 1 and the top plate 3 has been rotated inwardly to extend substantially perpendicularly to the flat inner surface of the left side plate 2, the claw portions 5a of the locking plate 5 are lightly engaged with the locking shaft 11 provided at the free end of the right side plate 4. Then, the locking plate 5 is rotated in the direction shown by an arrow about the coupling shaft 9 to engage strongly the claw portions 5a with the locking shaft 11, and at the same time the locking shaft 11 is moved toward the top plate 3. By means of the clank mechanism mentioned above, the top plate 3 extends substantially perpendicularly to the inner surface of the left side plate 2 and the right side plate 4 extends substantially perpendicularly to the inner surface of the main body 1.

Figure 5:
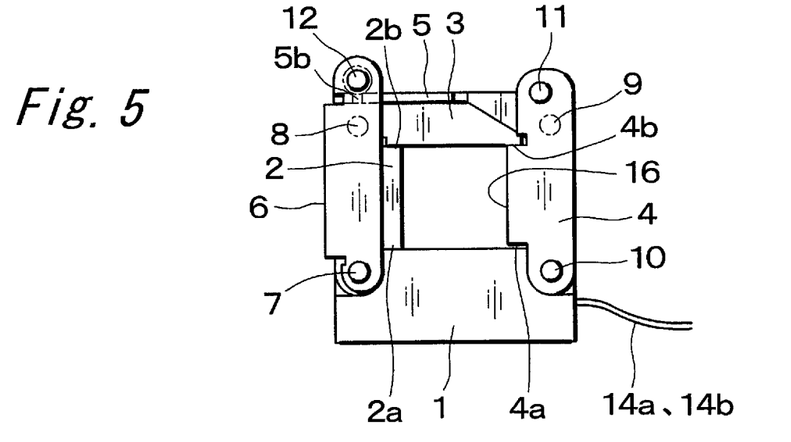
FIG. 5 is a side view showing the finally formed clamping opening.

By folding the left side plate 2, top plate 3 and right side plate 4 in the manner explained above, there is formed a clamping hole 16 having a square cross sectional configuration as depicted in FIG. 5. In order to maintain the desired square cross sectional configuration of the clamping hole 16, the fixing plate 6 is rotated toward the left side plate 2 such that the fixing plate 6 lies on the back surface of the left side plate 2. At the end of this rotation of the fixing plate 6, the rotating shaft 12 provided at the free end of the fixing plate 6 is rotated by an operator and the clamping portion 12a of the rotating shaft 12 is engaged with the slit 5b formed in locking plate 5.

Figure 6:
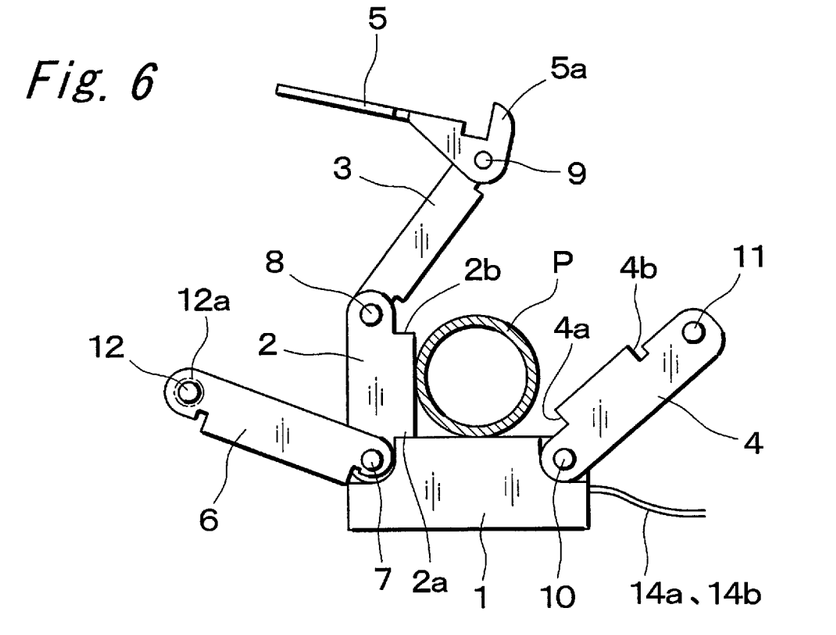
FIG. 6 is a side view depicting an initial condition for clamping a conduit.

Upon using the ultrasonic flowmeter apparatus of the present embodiment according to the invention, at first the apparatus is fixed to a frame by plural screwing bolts into tapped holes formed in a rear surface of the main body 1 not shown in the drawings. Then, as illustrated in FIG. 6, a conduit P made of a resilient and soft synthetic resin material such as Teflon (registered trade name) is placed on the upper surface of the main body 1. After that, the left side plate 2, top plate 3 and right side plate 4 are folded such that the conduit P is surrounded by the main body, left and right side plates and top plate. Next, the claw portion 5a of the locking plate 5 is urged against the locking shaft 11, and the locking plate 5 is rotated about the coupling shaft 9 to move the locking shaft 11 toward the top plate 3. In this manner, the main body 1, left and right side plates 2 and 4 and top plate 3 are locked in position by means of the clamp mechanism. During the rotation of the locking plate 5, the conduit P is deformed, and therefore the rotation of the locking plate 5 is carried out with a slight resistance and the locking condition is maintained positively.

Figure 7:
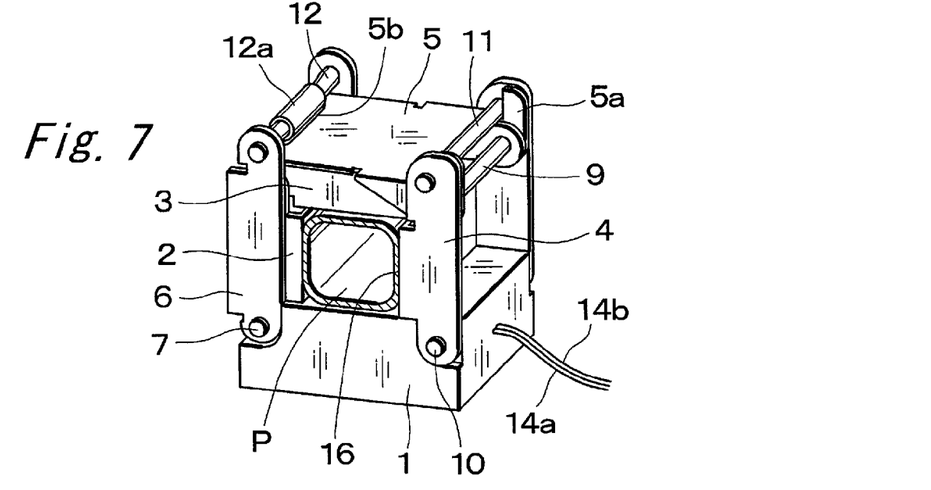
FIG. 7 is a perspective view illustrating a final condition in which the conduit has been clamped.

After locking by means of the locking plate 5, the fixing plate 6 is rotated and the clamping portion 12a of the shaft 12 is engaged with the elongated slit 5a formed in the locking plate 5 as depicted in FIG. 7 to fix the locking plate in position. Since the shaft 12 can rotate freely, the clamping portion 12a moves along the clamping plate 5 with rotation and the clamping portion can be easily engaged with the slit 5a.

In the mariner explained above, the conduit P is clamped within the clamping hollow space having a substantially square cross section formed by the main body 1, left side plate 2, top plate 3 and right side plate 4. The resilient conduit P is pushed by the inner walls of the main body, top plate and side plates and is deformed to have a substantially square cross sectional configuration. In this condition, the ultrasonic signal transmission and reception elements 13a and 13b provided in the main body 1 are aligned in the longitudinal direction of the conduit P.

The inner walls of the main body 1, left side plate 2, top plate 3 and right side plate 4 are coated with resin or plated with metal to have a slippery surface, and friction between the conduit P and the clamping hole 16 is reduced. Therefore, the conduit P can smoothly slide along the inner walls of the clamping hole 16 and is deformed into a stable configuration for the measurement within a short time period. In order to enhance the deformation of the conduit P, it is preferable to apply suitable grease on the inner walls of the clamping hole 16.

The reason for deforming the conduit P having circular cross sectional configuration into the substantially square cross sectional configuration is that a first portion of the conduit P is brought into intimate contact with the inner surface of the main body 1 and a second portion of the conduit P diagonally opposing to the first portion is brought into intimate contact with the inner surface of the top plate 3. Then, the conduit P is brought into contact with the ultrasonic beam propagating members 15a and 15b, and therefore the ultrasonic beam can be transmitted and received by the ultrasonic signal transmission and reception elements 13 and 13b in a positive and efficient manner and the ultrasonic beam can be reflected by the inner surface of the top plate 3 also in a positive and efficient manner. It should be noted that it is also important to bring the conduit P into intimate contact with the left and right side plates 2 and 4. This is due to the fact that if a cross sectional area of the conduit P is not kept to a given value by limiting the configuration of the conduit P, it is impossible to derive a correct flow rate which is derived as a product of a flow speed and a cross sectional area of the conduit P.

According to the invention, a circumferential length of the clamping hole 16 defined by the main body 1, left side plate 2, top late 3 and right side plate 4 is slightly longer than that of the conduit P, and therefore portions of the conduit P are deformed into arcuate cross sectional configuration at four corners of the clamping hole 16. If a circumferential length of the clamping hole 16 is shorter than that of the conduit P, there might be produced undesired wrinkles in the conduit P or portions of the conduit P are curved inwardly to make undesired spaces between the conduit P and the clamping hole 16. However, a circumferential length of the clamping hole 16 is too longer than that of the conduit P, the conduit P could not be brought into intimate contact with the inner walls of the main body 1, left and right side plates 2 and 4 and top plate 3 defining the clamping hole 16.

Figure 8:
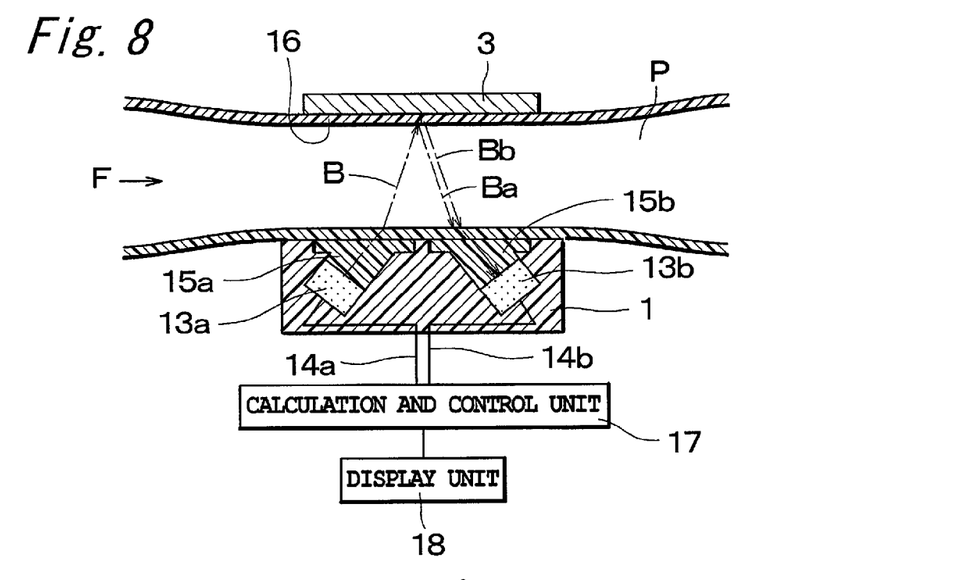
FIG. 8 is a cross sectional view for principally explaining the operation of the ultrasonic flowmeter apparatus.
Figure 9:
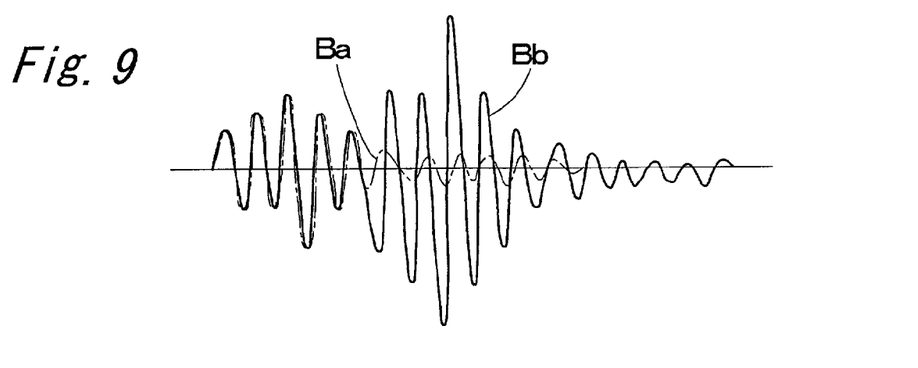
FIG. 9 is a wave form of an ultrasonic signal.

FIG. 8 is a cross sectional view for explaining the flow rate measurement. The ultrasonic wave transmission and reception elements 13a and 13b are connected to a calculation and control unit 17 by means of the lead wires 14a and 14b and an output of the calculation and control unit 17 is connected to a display unit 18. Upon measurement, a fluid F whose flow rate is to be measured is flown through the conduit P in a direction shown by an arrow in FIG. 8. One of the ultrasonic signal transmission and reception elements 13a and 13b is driven by a signal supplied from the calculation and control unit 17 to project an ultrasonic wave beam B into the fluid F is the ultrasonic wave propagating member 15a or 15b. The ultrasonic wave beam B is reflected at a portion of the conduit opposed to the ultrasonic wave transmission and reception elements 13a and 13b.

The emitted ultrasonic wave beam B is reflected by an inner boundary between the fluid F and the inner surface of the conduit P to produce an inner surface reflection beam Ba. At the same time, the ultrasonic wave beam B transmitted through the conduit P is reflected by an outer boundary between the outer surface of the conduit P and the inner surface of the top plate 3 to produce an outer surface reflection beam Bb. In this case, since the outer boundary surface is formed by materials having larger difference in specific impedance, and thus a level of the outer surface reflection beam Bb is larger than that of the inner surface reflection beam Ba. Therefore, the ultrasonic wave signal of the outer surface reflection beam Bb is extracted by the calculation and control unit 17.

The ultrasonic wave transmission and reception elements 13a and 13b are alternately driven several times. According to the invention, the reflection beams of the ultrasonic beam B can be obtained by the flat boundary between a portion of the conduit P and the flat inner surface of the top plate 3, and thus it is possible to obtain the reflection beams having a higher reflection efficiency as compared with the known flowmeters in which the conduits having circular cross sectional configuration are used without deformation.

Now propagation time differences between forward propagation times of the ultrasonic beams propagating in an forward direction of the fluid F and backward propagation times of the ultrasonic beams propagating in a direction opposite to the forward direction of the fluid F are measured several times, and then an average of these propagation time differences is calculated by the calculation and control unit 17. The calculation and control unit 17 calculates a flow speed of the fluid F from the thus calculated propagation time difference in accordance with the well known method.

In the calculation and control unit 17, a flow rate of the fluid F is obtained as a product of the thus calculated flow speed and a cross sectional area of the conduit P. According to the invention, since the conduit P is deformed to have a substantially square cross section, the cross sectional area of the conduit P could not be known. Therefore, it is preferable to perform a calibration by streaming a fluid through the deformed conduit P at known flow rates. A finally calculated flow rate is displayed on the display unit 18.

In an actual measurement, when the fluid F flows through the conduit P, the conduit P is further deformed by a pressure of the fluid F and is urged with a stronger force against the inner walls defining the clamping hole 16. Therefore, the cross sectional area of the conduit P is liable to increase. Therefore, an accurate value of the flow rate can be obtained after elapsing a certain time period after a start of fluid flow.

After the measurement, the ultrasonic flowmeter apparatus may be removed from the conduit P in the following manner. At first, the fixing plate 6 is removed from the locking plate 5 under the condition shown in FIG. 7. Then, the clamping plate is rotated away from the top plate 3 to disengage the claw portions 5a from the locking shaft 11. In this manner the clamping mechanism is released. Finally, the left side plate 2, top plate 3 and right side plate 4 are rotated outwardly as depicted in FIG. 6.

Embodiment 2

Figure 10:
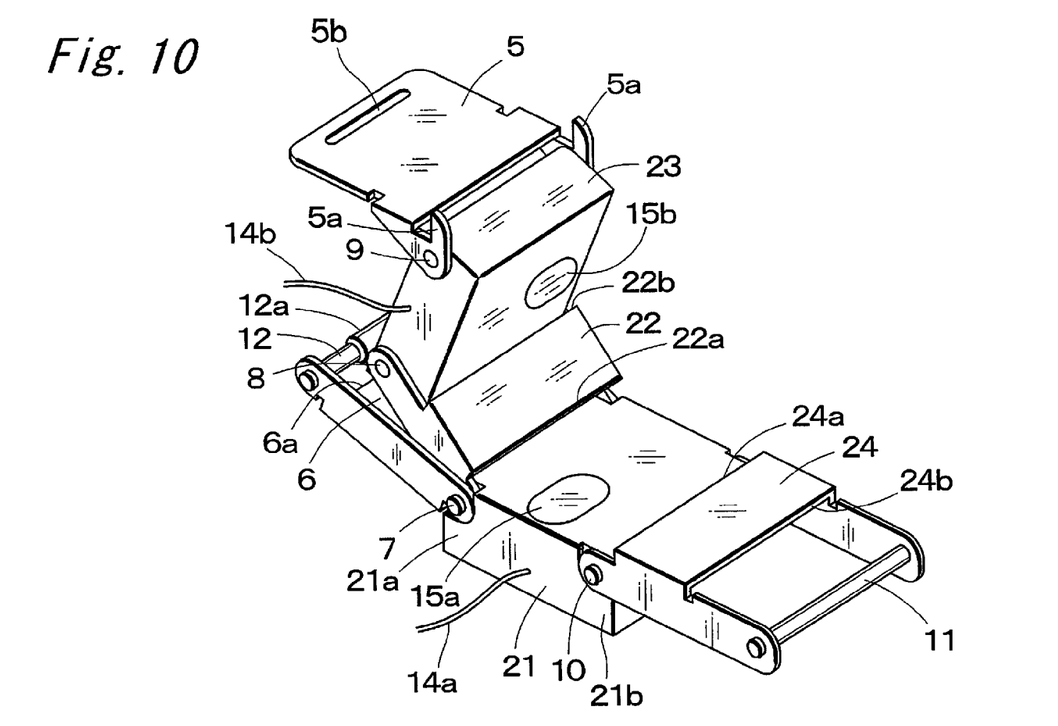
FIG. 10 is a perspective view showing a second embodiment 2 of the ultrasonic flowmeter apparatus according to the invention.

FIG. 10 is a perspective view showing a second embodiment of the ultrasonic flowmeter apparatus of Z-system according to the invention. In the second embodiment, portions similar to those of the first embodiment are denoted by the same reference numerals used in the first embodiment. A first main body 22, a left side plate 22, a second main body 23, a right side plate 24, a locking plate 5 and a fixing plate 5 are coupled with one another by means of hinge mechanisms. That is to say, the left side plate 22 and fixing plate 6 are rotatably secured to an end portion 21a of the first main body 21 by means of a common coupling shaft 7 such that the left side plate 22 situates inside the fixing plate 6, and the second main body 23 is rotatably secured to the other end of the left main body 22 by means of a coupling shaft 8. Furthermore, the locking plate 5 is rotatably secured to the other end of the second main body 23 by means of a coupling shaft 9, and the right side plate 24 is rotatably secured to the other end portion 21b of the first main body 21 by means of a coupling shaft 10.

The first and second main bodies 21 and 23 may be formed by an injection mold of synthetic material, and the left side plate 22, right side plate 24, locking plate 5 and fixing plate 6 may be formed by punching a metal sheet with a press such that each of these plates includes a flat portion and both side portions protruding perpendicularly to the flat portion like as the first embodiment. The ends of the coupling shafts 7, 8, 9 and 10 are inserted into holes formed in the side portions of the plates such that the plates can rotate about the coupling shafts. Each of the main body 21, left side plate 22, second main body 23 and right side plate 24 has a flat inner surface.

Figure 11:
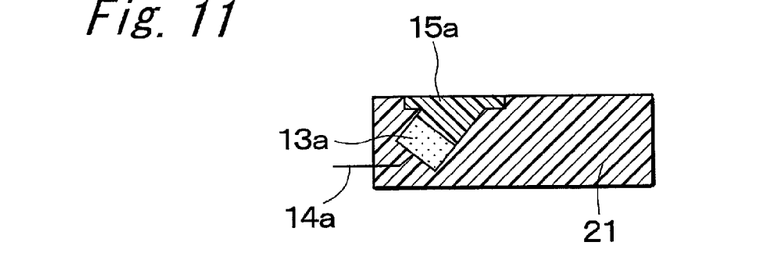
FIG. 11 is a cross sectional view depicting a first main body.
Figure 12:
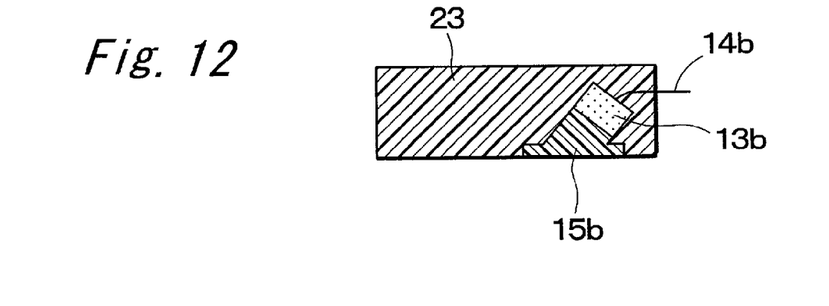
FIG. 12 is a cross sectional view illustrating a second main body.

As illustrated in FIGS. 11 and 12, ultrasonic signal transmission and reception elements 13a and 13b are embedded within the first and second main bodies 21 and 23, and lead wires 14a and 14b connected to the ultrasonic signal transmission and reception elements 13a and 13b are extended outward. The ultrasonic signal transmission and reception elements 13a and 13b are arranged at such positions that these elements are separated in a longitudinal direction of the first and second main bodies 21 and 23. Ultrasonic beam propagating members 15a and 15b are provided between the ultrasonic signal transmission and reception elements 13a and 13b and the flat inner surfaces of the first and second main bodies 21 and 23.

Figure 13:
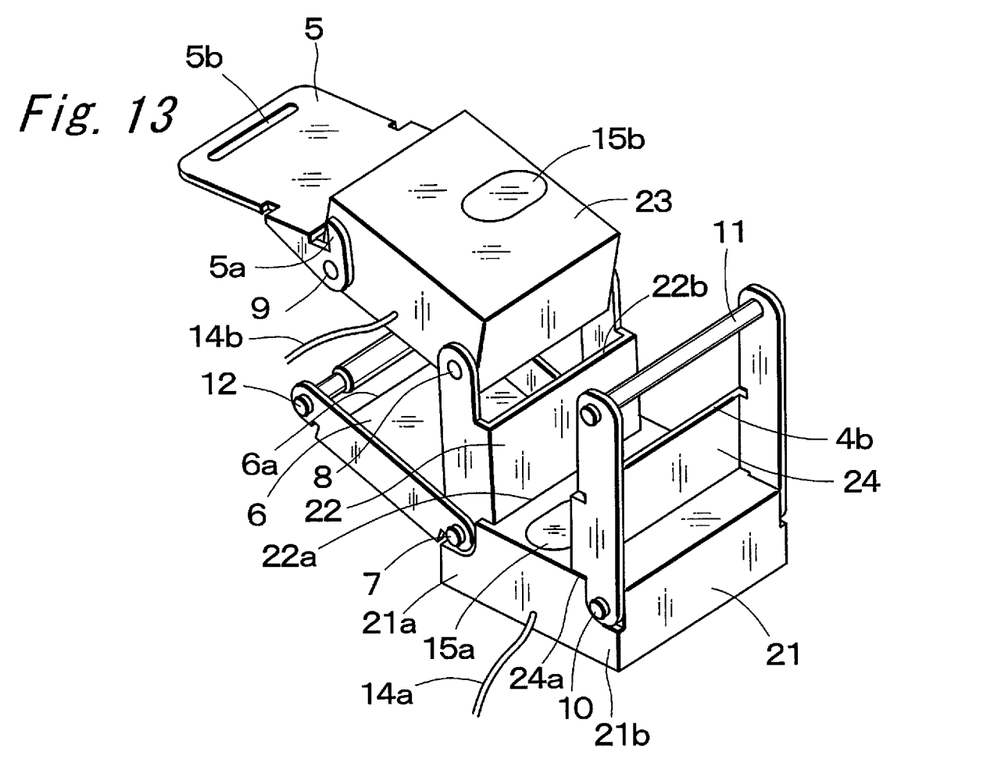
FIG. 13 is a perspective view showing a condition in which right and left side face plates are moved into upright positions.

FIG. 13 is a perspective view showing a condition in which the left and right side plates 22 and 24 are folded inwardly. As explained above, the left side plate 22 and fixing plate 6 are journalled to the one end 21a of the first main body 21 by means of the coupling shaft 7, and the rotation of the left side plate 22 is limited by the engagement of a side 22a of the flat surface of the left side plate 22 with the inner surface of the first main body 21 such that the left side plate 22 extends substantially perpendicularly to the inner surface of the first main body 21. The right side plate 24 having a longer length than the left side plate 22 is also journalled to the other end 21b of the first main body 21, and the rotation of the right side plate 24 is limited by the engagement of the side 24a of the right side plate 24 with the inner surface of the first main body 21 such that the right side plate 24 stands on the on the first main body substantially perpendicularly to the inner surface of the first main body 21.

The second main body 23 is journalled to the left side plate 22 by means of the coupling shaft 8 and the rotation of the second main body 23 is limited by the engagement of the inner surface of the second main body 23 with the side 22b of the left side plate 22 such that the second main body 23 extends substantially perpendicularly to the inner surface of the left side plate 22

Figure 14:
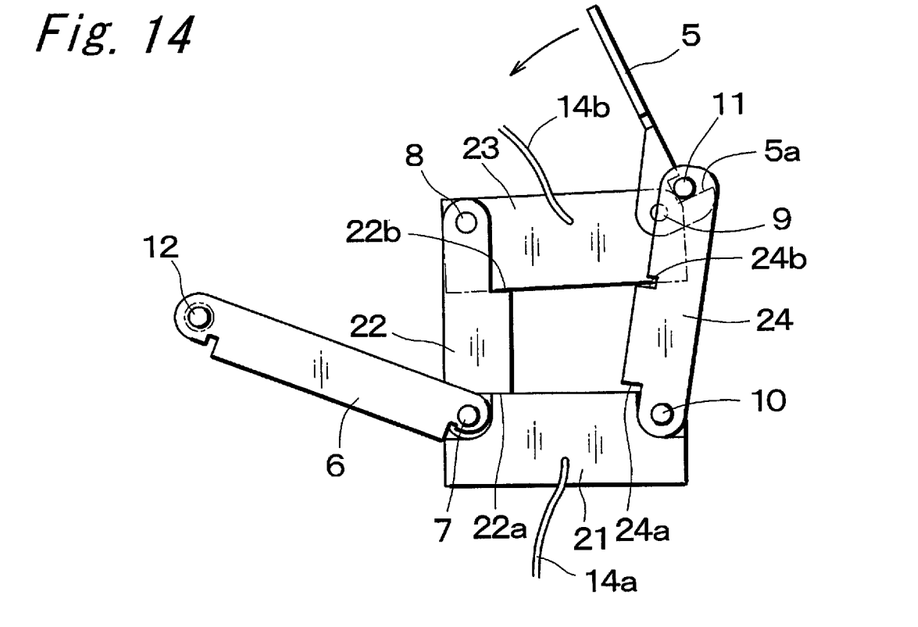
FIG. 14 is a side view representing a condition in which a clamping opening is formed.

As shown in FIG. 14, after the left side plate 22 and right side plate 24 have been rotated to extend substantially perpendicularly to the inner surface of the first main body 21 and the second main body 23 has been rotated inwardly to extend substantially perpendicularly to the flat inner surface of the left side plate 22, claw portions 5a formed at both ends of the locking plate 5 are lightly engaged with a locking shaft 11 provided at the free end of the right side plate 24. Then, the locking plate 5 is rotated in the direction shown by an arrow in FIG. 14 about the coupling shaft 9 to engage strongly the claw portions 5a with the locking shaft 11. During the rotation of the locking plate 5, the second main body 23 and right side plate 24 are slightly rotated inwardly by means of the clank mechanism, and the second main body 23 extends substantially perpendicularly to the inner surfaces of the left side plate 22 and right side plate 24.

Figure 15:
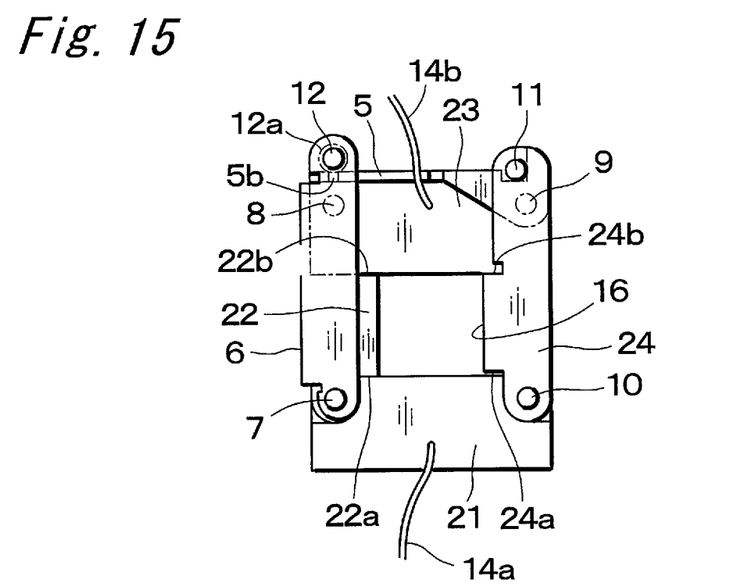
FIG. 15 is a side view showing a final condition for forming the clamping opening.

By folding the left side plate 22, second main body 23 and right side plate 24 in the manner explained above, there is formed a clamping hole 16 having a square cross sectional configuration as depicted in FIG. 15. In order to maintain the desired square cross sectional configuration of the clamping hole 16, the fixing plate 6 is rotated toward the left side plate 22 such that a clamping portion 12a of a rotating shaft 12 is engaged with a slit 5b formed in locking plate 5.

Figure 16:
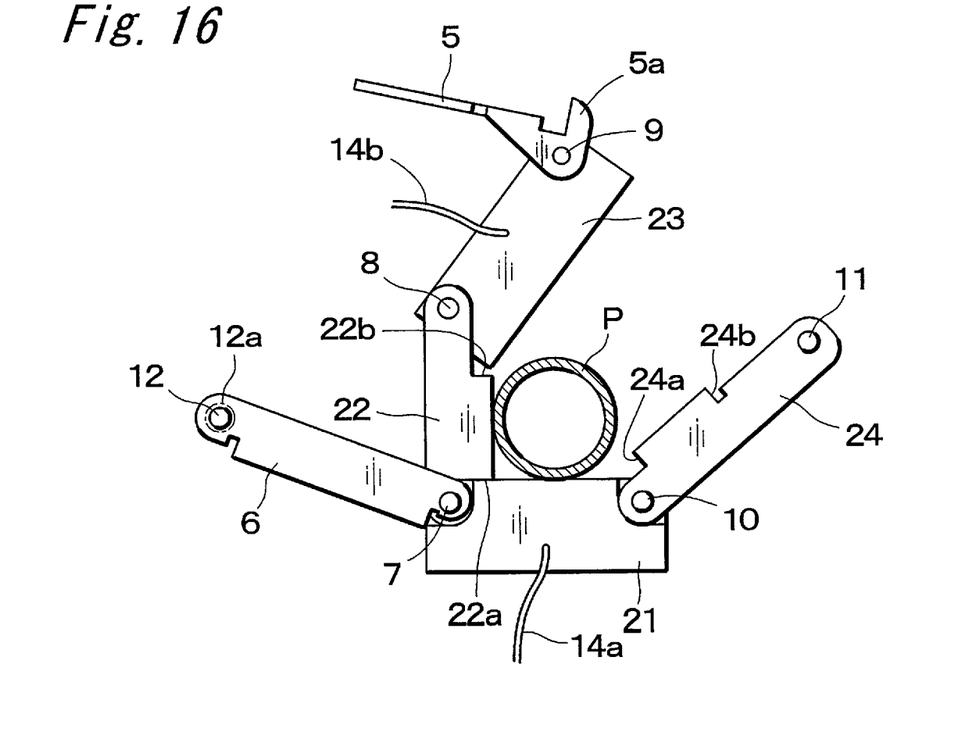
FIG. 16 is a side view illustrating an initial condition for clamping the conduit.
Figure 17:
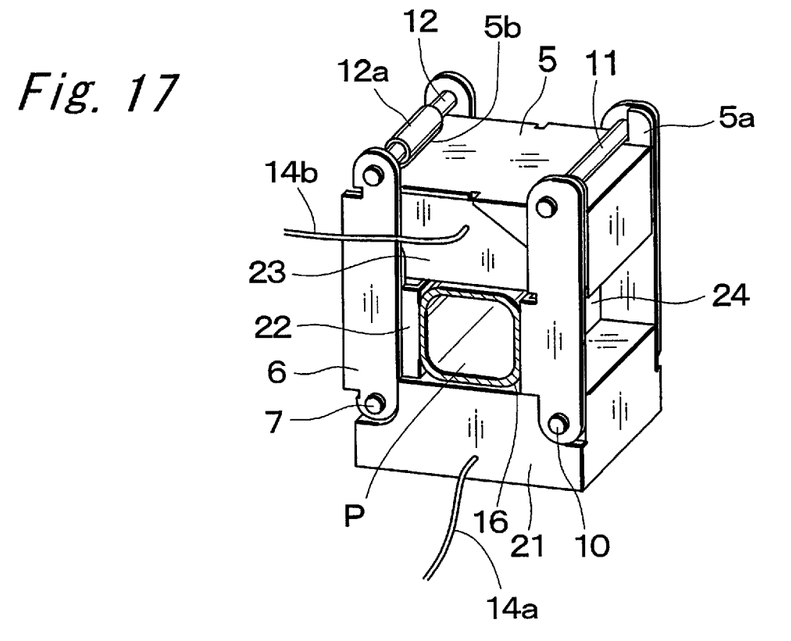
FIG. 17 is a perspective view depicting a condition in which the conduit has been clamped in the clamping opening.

Upon using the ultrasonic flowmeter apparatus of the second embodiment according to the invention, the first main body 21 is secured to a frame, and then a conduit P is placed on the flat inner surface of the first main body 21 as illustrated in FIG. 16. After that, the left side plate 22, second main body 23 and right side plate 24 are folded to surround the conduit P. Next, after engaging the claw portions 5a of the locking plate 5 with the locking shaft 11, the locking plate 5 is rotated, and finally the fixing plate 6 is rotated to fix the locking plate 5 as shown in FIG. 17.

In the manner just explained above, the conduit P is clamped within the clamping hole 16 defined by the inner surfaces of the first and second main bodies 21 and 23 and left and right side plates 22 and 24. The conduit P made of a resilient material is deformed to have a substantially square cross section corresponding to the square cross sectional configuration of the clamping hole 16, and therefore a substantial portion of the conduit P is brought into intimate contact with the inner walls of the clamping hole 16. In this condition, the ultrasonic signal transmission and reception elements 13a and 13b are positions which are separated from each other viewed in a longitudinal direction of the conduit P.

Figure 18:
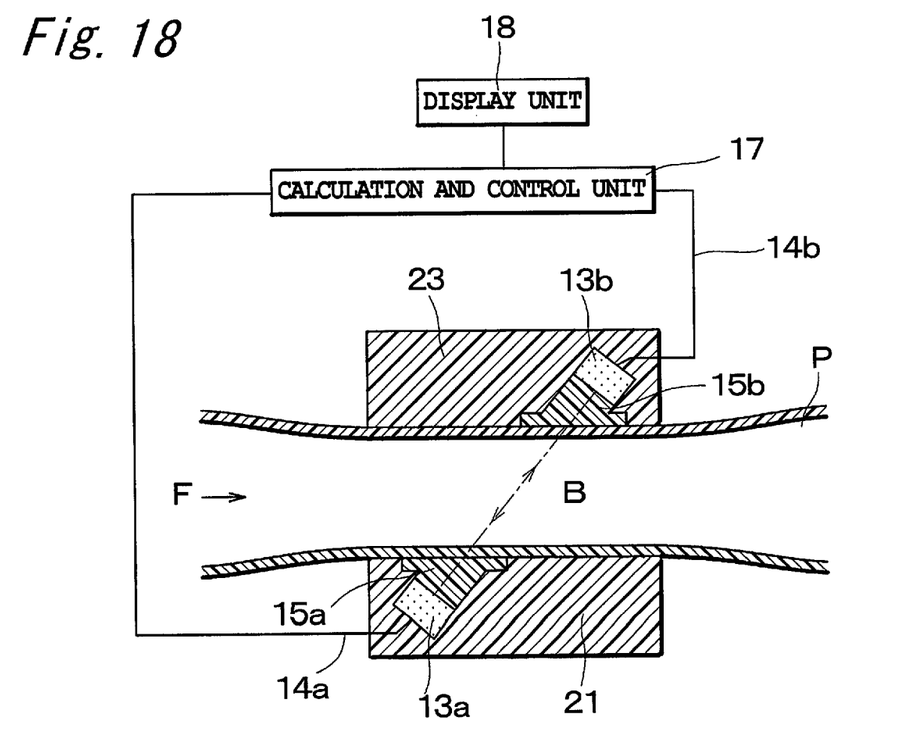
FIG. 18 is a schematic view representing a measuring principal of the ultrasonic flowmeter apparatus.

FIG. 18 is a cross sectional view for explaining the flow rate measurement. The ultrasonic signal transmission and reception elements 13a and 13b are connected to a calculation and control unit 17 via the lead wires 14a and 14b and an output of the calculation and control unit 17 is connected to a display unit 18. Upon measurement of a flow rate of the fluid F passing through the conduit P, the fluid F is flowed through the conduit P in a direction shown by an arrow in FIG. 18. One of the ultrasonic signal transmission and reception elements 13a and 13b is driven by a signal supplied from the calculation and control unit 17 to project an ultrasonic wave beam U into the fluid F via the ultrasonic wave, propagating member 15a or 15b in a direction inclined by a given angle with respect to the longitudinal axial direction of the conduit P. The ultrasonic wave beam B is received by the other ultrasonic wave transmission and reception element 13b or 13a. In this manner, the flow rate measurement of the Z-system is carried out.

The ultrasonic wave transmission and reception elements 13a and 13b are alternately driven several times. An average propagation time difference between forward propagation times of the ultrasonic beams propagating in an forward direction of the fluid F and backward propagation times of the ultrasonic beams propagating in a direction opposite to the forward direction of the fluid F is calculated by the calculation and control unit 17 in accordance with the known method. In the calculation and control unit 17, a flow rate is derived as a product of the average flow speed of the fluid F and a cross sectional area of the conduit P in the deformed condition. The thus derived flow rate is displayed on the display unit 18.

After the measurement, the ultrasonic flowmeter apparatus may be removed from the conduit P in the following manner. At first, the fixing plate 6 is removed from the locking plate 5 under the condition shown in FIG. 17. Then, the clamping plate 5 is rotated away from the top plate 3 to disengage the claw portions 5a from the locking shaft 11 to release the clamp mechanism. Finally, the left side plate 22, second main body 23 and right side plate 24 are rotated outwardly as depicted in FIG. 16.

Figure 19:
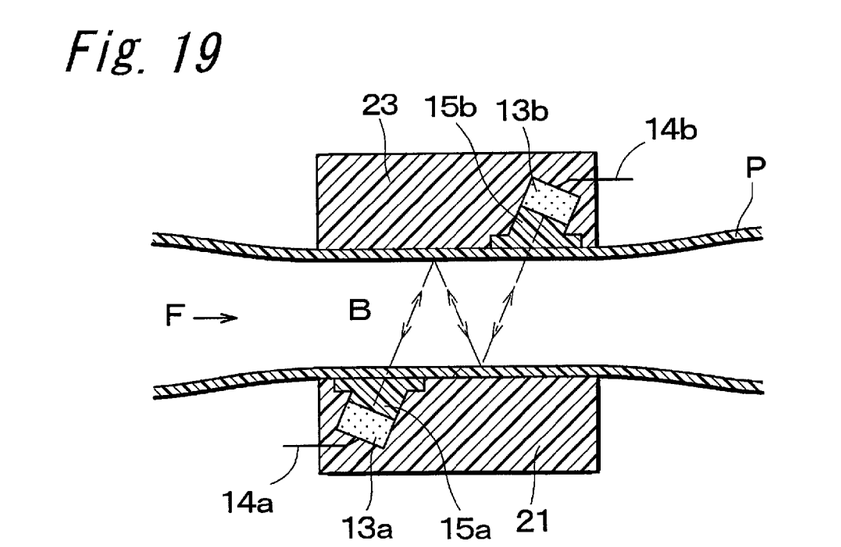
FIG. 19 is a schematic view showing a modified embodiment of the ultrasonic flowmeter apparatus.

FIG. 19 is a modification of the second embodiment of the ultrasonic flowmeter apparatus according to the invention. In this modified embodiment, the ultrasonic signal transmission and reception elements 13a and 13b and ultrasonic beam propagating members 14a and 14b are arranged such that the ultrasonic beam B emitted from one of the ultrasonic signal transmission and reception element 13a and 13b is received by the other ultrasonic signal transmission and reception element 13b or 13a after the ultrasonic beam is reflected two times within the conduit P. Then, a propagation length of the ultrasonic beam B within the conduit P can be made longer than that of the second embodiment, and therefore a sensitivity of the measurement can be enhanced. According to the invention, the reflection of the ultrasonic beam is performed at a portion at which the conduit P is deformed to be flat, and thus the reflection efficiency can be improved as compared with the conventional apparatus in which the conduit having a circular cross sectional configuration is used without being deformed.

Embodiment 3

Figure 20:
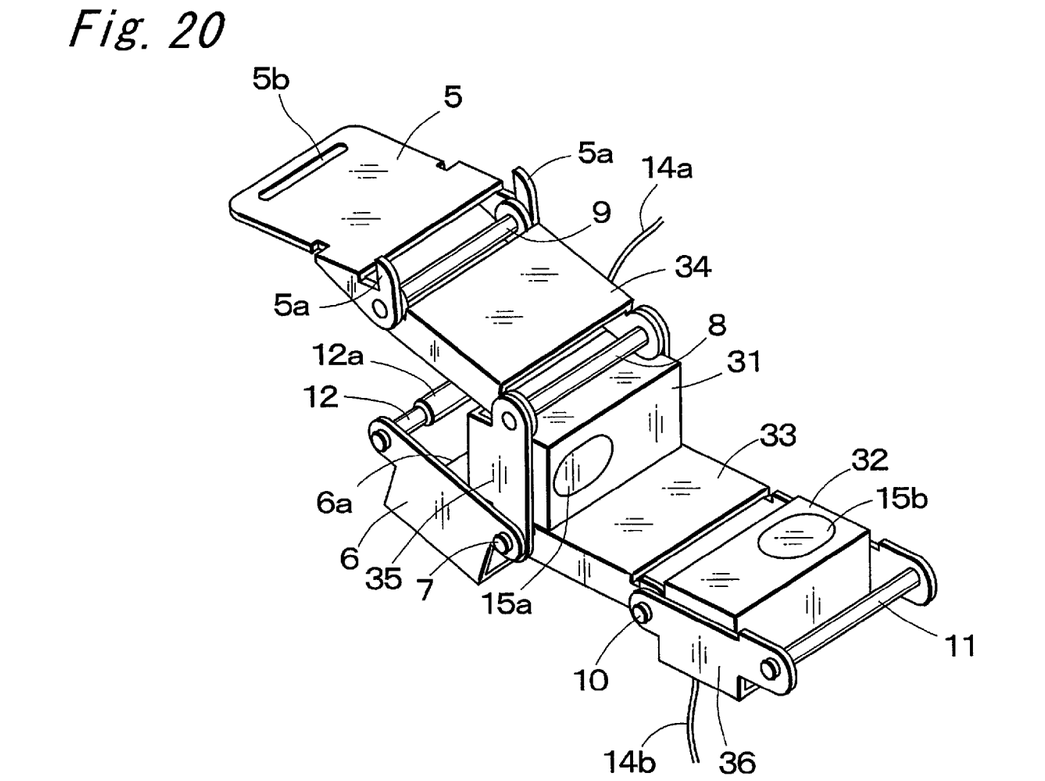
FIG. 20 is a perspective view illustrating a third embodiment 3 of the ultrasonic flowmeter apparatus according to the invention.
Figure 21:
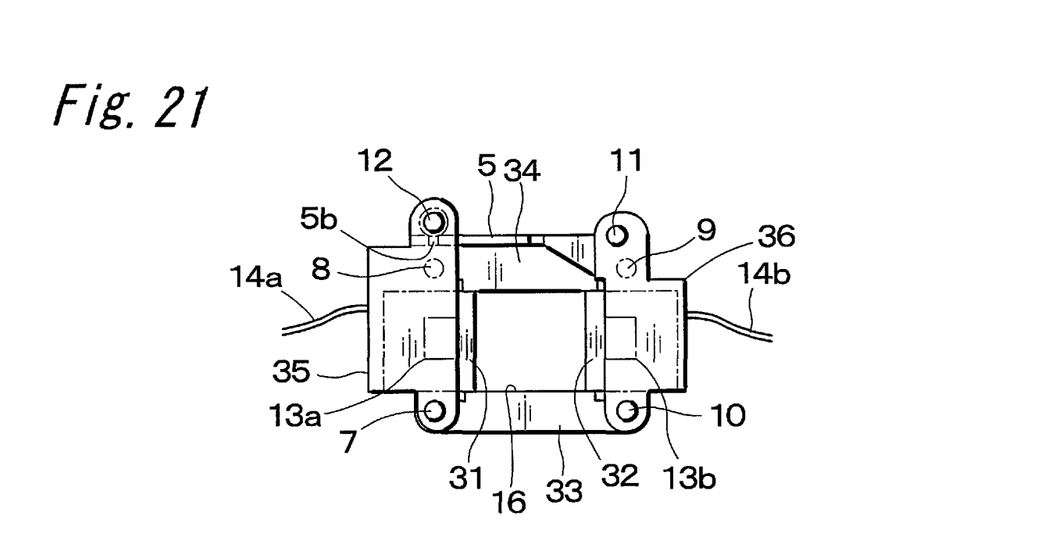
FIG. 21 is a side view representing a condition in which the clamping opening has been formed.

FIGS. 20 and 21 are perspective and side views showing a third embodiment of the ultrasonic flowmeter apparatus according to the invention. The third embodiment belongs to the Z-system. In the third embodiment, portions similar to those of the second embodiment are denoted by the same reference numerals used in the explanation of the second embodiment.

In the third embodiment, a first main body 31 including an ultrasonic signal transmission and reception element 13a and ultrasonic beam propagating member 15a is provided at a position at which the left side plate 22 in the second embodiment is arranged, and a second main body 32 including an ultrasonic signal transmission and reception element 13b and ultrasonic beam propagating member 15b is provided at a position at which the right side plate 24 in the second embodiment is arranged. The first and second main bodies 31 and 32 are made of a synthetic resin. A bottom plate 33 and a top plate 34 are provided at positions at which the first and second main bodies 21 and 23 in the second embodiment are arranged. The bottom and top plates 33 and 34 are made of a metal.

The first and second main bodies 31 and 32 and the bottom and top plates 33 and 34 are mutually coupled with one another in a similar manner as the second embodiment. In the third embodiment, since the first and second main bodies 31 and 32 are made of a synthetic resin, these main bodies are hold by supporting members 35 and 36, respectively made of a metal, and coupling shafts 7, 8, 10 and locking shaft 11 are journalled to the supporting members 35 and 36. Also in the third embodiment, a clamping hole 16 having a square cross sectional configuration is formed by folding the first and second main bodies 31 and 32 and bottom and top plates 33 and 34 in a manner similar to that of the second embodiment. The flow rate of a fluid can be performed in a manner principally identical with that of the first and second embodiments.

The present invention is not limited to the first to third embodiments so far explained, but many modifications and alternations may be conceived by a person skilled in the art within the scope of the invention. For instance, in the first to third embodiments, the fixing plate 6 is provided for maintaining the clamp mechanism, but according to the invention the clamp mechanism may be maintained by the locking plate 5 by suitably designing a position and a shape of the claw portion 5a or by utilizing the elastic force of the conduit P. Furthermore, the clamp mechanism may be maintained by any suitable clamp fixing mechanism.

It should be noted that in the above explained first to third embodiments, all parts have been coupled with each other at a factory, but according to the invention separate parts may be assembled by users at a site at which the ultrasonic flowmeter apparatus is actually used to measure a flow rate of a fluid. Moreover, according to the invention, it is not always necessary to couple rotatably all the members forming the clamping hole with one another, but adjacent two members may be fixed such that these members extend in orthogonal directions. Furthermore, in the first to third embodiments, the clamping hole is formed to have a square cross sectional configuration, but according to the invention, the clamping hole may have a rectangular cross sectional configuration.

It should be noted that according to the invention, the first main bodies 21, 31 and second main bodies 23, 32 may be made of a metal. In the first to third embodiments, the left side plates 2, 22 and right side plates 4, 24, bottom plate 33 and to plate 34 are made of a metal, but these members may be made of a synthetic resin or major portions of these members may be formed by a metal and the remaining portions may be formed by a synthetic resin.

In the above explained first to third embodiments of the ultrasonic flowmeter apparatus according to the invention, the members for forming the clamping hole are denoted as the left side plates 2, 22, right side plates 4, 24, bottom plate 33 and top plate 34 for the sake of explanation, but the terms "left and right" may be replaced by "right and left" and "bottom and top" may be reversed into "top and bottom", and further the terms "left and right" and "left and right" may be mutually reversed.

The invention claimed is:

1. An ultrasonic flowmeter apparatus detachably secured to a conduit made of a resilient and soft material for measuring a flow rate of a fluid flowing through said conduit comprising:
    four plate-like members each having a flat inner surface;
    a hinge mechanism for coupling said plate-like members to be folded freely to constitute a clamping hole by said inner surfaces, said clamping hole having a rectangular cross sectional configuration;
    a clamping mechanism for maintaining the clamping hole to have the rectangular cross sectional configuration; and
    a pair of ultrasonic signal transmission and reception elements arranged in an inner surface of one of said four plate-like members such that the ultrasonic signal transmission and reception elements are separated in a longitudinal direction of the conduit;
    wherein said clamping hole is formed to have a size such that when the conduit is clamped within the clamping hole, the conduit is resiliently deformed to have a substantially rectangular cross sectional configuration and is brought into intimate contact with the inner surfaces of the plate-like members, and said ultrasonic signal transmission and reception elements are arranged at positions such that an ultrasonic beam emitted from one of the ultrasonic signal transmission and reception elements is received by the other ultrasonic signal transmission and reception element after the ultrasonic beam is reflected at a portion of an inner surface of a plate-like member which is opposed to the plate-like member in which the ultrasonic signal transmission and reception elements are arranged.

2. An ultrasonic flowmeter apparatus detachably secured to a conduit made of a resilient and soft material for measuring a flow rate of a fluid flowing through the conduit comprising:
    four plate-like members each having a flat inner surface;
    a hinge mechanism for coupling said plate-like members to be folded freely to constitute a clamping hole by said inner surfaces, said clamping hole having a rectangular cross sectional configuration;
    a clamping mechanism for maintaining the clamping hole to have the rectangular cross sectional configuration; and
    a pair of ultrasonic signal transmission and reception elements arranged in inner surfaces of two plate-like members diagonally opposed to each other, said ultrasonic signal transmission and reception elements being separated in a longitudinal direction of the conduit;
    wherein said clamping hole is formed to have a size such that when the conduit is clamped within the clamping hole, the conduit is resiliently deformed to have a substantially rectangular cross sectional configuration and is brought into intimate contact with the inner surfaces of the plate-like members, and said ultrasonic signal transmission and reception elements are arranged at positions such that an ultrasonic beam emitted from one of the ultrasonic signal transmission and reception elements is received by the other ultrasonic signal transmission and reception element.

3. The ultrasonic flowmeter apparatus according to claim 1, wherein said hinge mechanism includes a plurality of coupling shafts.

4. The ultrasonic flowmeter apparatus according to claim 1, wherein said clamp mechanism includes a locking plate having at least one claw portion and being journalled to a first end of an array of the four plate-like members, and a locking shaft arranged on a second end of the array, whereby the rectangular cross sectional configuration of the clamping hole is maintained by engaging said claw portion with the locking shaft.

5. The ultrasonic flowmeter apparatus according to claim 4, wherein said clamping mechanism further comprises a fixing plate for fixing said locking plate in a position such that the claw portion is firmly engaged with the locking shaft.

6. The ultrasonic flowmeter apparatus according to claim 1, wherein said clamping hole has a square cross sectional configuration.

7. The ultrasonic flowmeter apparatus according to claim 1, wherein an inner length of said clamping hole is longer than an outer circumferential length of the conduit.

8. The ultrasonic flowmeter apparatus according to claim 1, wherein the inner surfaces of said four plate-like members are coated with a material such that the conduit can easily slip along the inner surfaces.

9. The ultrasonic flowmeter apparatus according to claim 1, wherein said ultrasonic wave beam is reflected by a boundary between the conduit and the inner wall of the plate-like member which is diagonally opposed to the plate-like member in which the ultrasonic signal transmission and reception element is arranged.

10. The ultrasonic flowmeter apparatus according to claim 2, wherein said hinge mechanism includes a plurality of coupling shafts.

11. The ultrasonic flowmeter apparatus according to claim 2, wherein said clamp mechanism includes a locking plate having at least one claw portion and being journalled to a first end of an array of the four plate-like members, and a locking shaft arranged on a second end of the array, whereby the rectangular cross sectional configuration of the clamping hole is maintained by engaging said claw portion with the locking shaft.

12. The ultrasonic flowmeter apparatus according to claim 11, wherein said clamping mechanism further comprises a fixing plate for fixing said locking plate in a position such that the claw portion is firmly engaged with the locking shaft.

13. The ultrasonic flowmeter apparatus according to claim 2, wherein said clamping hole has a square cross sectional configuration.

14. The ultrasonic flowmeter apparatus according to claim 2, wherein an inner length of said clamping hole is longer than an outer circumferential length of the conduit.

15. The ultrasonic flowmeter apparatus according to claim 2, wherein the inner surfaces of said four plate-like members are coated with a material such that the conduit can easily slip along the inner surfaces.

16. The ultrasonic flowmeter apparatus according to claim 3, wherein said clamping hole has a square cross sectional configuration.

17. The ultrasonic flowmeter apparatus according to claim 3, wherein an inner length of said clamping hole is longer than an outer circumferential length of the conduit.

18. The ultrasonic flowmeter apparatus according to claim 3, wherein the inner surfaces of said four plate-like members are coated with a material such that the conduit can easily slip along the inner surfaces.

19. The ultrasonic flowmeter apparatus according to claim 4, wherein said clamping hole has a square cross sectional configuration.

20. The ultrasonic flowmeter apparatus according to claim 4, wherein an inner length of said clamping hole is longer than an outer circumferential length of the conduit.

* * * * *